United States Patent
Shin

(10) Patent No.: US 12,440,865 B2
(45) Date of Patent: Oct. 14, 2025

(54) SUBSTRATE TREATING APPARATUS AND METHOD FOR VERIFYING ERROR OF FLOW METER USING THE SAME

(71) Applicant: SEMES CO., LTD., Cheonan-si (KR)

(72) Inventor: Joon-Ho Shin, Cheonan-si (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 279 days.

(21) Appl. No.: 17/965,233

(22) Filed: Oct. 13, 2022

(65) Prior Publication Data

US 2023/0120764 A1  Apr. 20, 2023

(30) Foreign Application Priority Data

Oct. 14, 2021  (KR) .................... 10-2021-0136376

(51) Int. Cl.
 *B05C 11/10*  (2006.01)
(52) U.S. Cl.
 CPC ........ *B05C 11/101* (2013.01); *B05C 11/1013* (2013.01); *B05C 11/1026* (2013.01)
(58) Field of Classification Search
 None
 See application file for complete search history.

(56) References Cited

U.S. PATENT DOCUMENTS

| | | | | |
|---|---|---|---|---|
| 9,823,667 B2 * | 11/2017 | Takijiri | ................ | G05D 7/0635 |
| 10,969,259 B2 * | 4/2021 | Sawada | ................ | G01F 25/15 |
| 11,446,696 B2 * | 9/2022 | Suzuki | ................ | B05C 5/02 |
| 12,142,496 B2 * | 11/2024 | Amano | ............ | H01L 21/67103 |
| 2022/0260396 A1 * | 8/2022 | Hengstler | ............. | G01D 11/30 |

(Continued)

FOREIGN PATENT DOCUMENTS

| | | | | |
|---|---|---|---|---|
| JP | H10216605 A | * | 8/1998 | ............ B05C 11/08 |
| JP | 2006105957 A | | 4/2006 | |
| KR | 100985754 B1 | | 10/2010 | |

(Continued)

*Primary Examiner* — Jethro M. Pence
(74) *Attorney, Agent, or Firm* — Harness, Dickey & Pierce, P.L.C.

(57) ABSTRACT

The inventive concept provides a substrate treating apparatus. The substrate treating apparatus includes a housing having a treating space for treating a substrate therein; a support unit configured to support the substrate at the treating space; a nozzle for supplying a liquid to the substrate placed on the support unit; a liquid supply unit configured to supply the liquid to the nozzle and have a flow meter; and a flow rate measuring unit configured to verify an error of the flow meter; and a controller for controlling the liquid supply unit and the flow rate measuring unit, and wherein the flow rate measuring unit comprises: a cup for accommodating the liquid; a measuring means configured to verify a level of the liquid accommodated in the cup; and a discharge line for discharging the liquid within the cup and having a discharge valve installed thereon, and wherein the controller controls the liquid supply unit to discharge a liquid of a first amount to the cup for a first time in a state at which the discharge valve is closed, and controls the measuring means to determine whether an error has occurred in the flow meter by determining whether the level of the liquid accommodated in the cup is the first amount.

2 Claims, 9 Drawing Sheets

(56) References Cited

U.S. PATENT DOCUMENTS

2023/0184574 A1\* 6/2023 Yun ...................... B05C 11/101
118/712

FOREIGN PATENT DOCUMENTS

| KR | 10-20140026162 A | 3/2014 |
|----|------------------|--------|
| KR | 101928010 B1 | 2/2019 |
| KR | 10-2020-0048941 A | 5/2020 |

\* cited by examiner

SUBSTRATE TREATING APPARATUS AND METHOD FOR VERIFYING ERROR OF FLOW METER USING THE SAME

CROSS-REFERENCE TO RELATED APPLICATIONS

A claim for priority under 35 U.S.C. § 119 is made to Korean Patent Application No. 10-2021-0136376 filed on Oct. 14, 2021, in the Korean Intellectual Property Office, the entire contents of which are hereby incorporated by reference.

BACKGROUND

Embodiments of the inventive concept described herein relate to a substrate treating apparatus having a liquid supply unit for supplying a liquid on a substrate and a flow meter error verification method using the same.

The semiconductor manufacturing process includes a liquid treatment process of treating a substrate by supplying a liquid onto the substrate. When treating the substrate using the liquid, the liquid must be sprayed in a fixed amount according to a recipe of each process. To this end, a flow meter for measuring a flow rate of the liquid is provided in a liquid supply unit which supplies the liquid to the substrate.

However, if an error occurs in the flow meter, there is a problem that a preset quantity is not supplied to the substrate even if the flow meter is set to supply the fixed amount.

To solve this problem, an operator visually checked the flow rate of the liquid discharged from the flow meter, but it is difficult to check the fixed amount, takes a lot of time to measure the flow rate, and it is difficult to store a data automatically.

In order to solve this problem, the flow rate of a discharged liquid was calculated by measuring a weight of the liquid, but a calculation work reflecting characteristics of the liquid is necessary, which takes a time and a cost for the operator to install the equipment to measure the weight of the liquid.

SUMMARY

Embodiments of the inventive concept provide a substrate treating apparatus and a flow meter error verification method using the same for accurately measuring an error of the flow meter.

The technical objectives of the inventive concept are not limited to the above-mentioned ones, and the other unmentioned technical objects will become apparent to those skilled in the art from the following description.

The inventive concept provides a substrate treating apparatus. The substrate treating apparatus includes a housing having a treating space for treating a substrate therein; a support unit configured to support the substrate at the treating space; a nozzle for supplying a liquid to the substrate placed on the support unit; a liquid supply unit configured to supply the liquid to the nozzle and have a flow meter; and a flow rate measuring unit configured to verify an error of the flow meter; and a controller for controlling the liquid supply unit and the flow rate measuring unit, and wherein the flow rate measuring unit includes: a cup for accommodating the liquid; a measuring means configured to verify a level of the liquid accommodated in the cup; and a discharge line for discharging the liquid within the cup and having a discharge valve installed thereon, and wherein the controller controls the liquid supply unit to discharge a liquid of a first amount to the cup for a first time in a state at which the discharge valve is closed, and controls the measuring means to determine whether an error has occurred in the flow meter by determining whether the level of the liquid accommodated in the cup is the first amount.

In an embodiment, the measuring means includes: an auxiliary container which is provided to communicate with an inner space of the cup at a side of the cup; and a level sensor provided in the auxiliary container and for detecting the level of the liquid accommodated in the cup.

In an embodiment, the measuring means includes a level sensor provided above the cup to irradiate a light to a surface of the liquid accommodated at the cup to detect the level of the liquid.

In an embodiment, the measuring means includes a level sensor inserted into a side of the cup and for detecting the level of the liquid accommodated in the cup.

In an embodiment, the measuring means includes: a first pipe communicating with the cup at a first height; a second pipe communicating with the cup at a second height which is higher than the first height; and a third pipe communicating with the first pipe and the second pipe; and a level sensor provided within the third pipe and for detecting the level of the liquid accommodated in the third pipe.

In an embodiment, the controller further comprises an alarm unit for generating an alarm if it is determined that an error has occurred in the flow meter.

In an embodiment, the flow rate measuring unit is provided within the housing.

The inventive concept provides a substrate treating apparatus. The substrate treating apparatus includes a housing having a treating space for treating a substrate therein; a support unit configured to support the substrate at the treating space; a nozzle for supplying a liquid to the substrate placed on the support unit; a liquid supply unit configured to supply the liquid to the nozzle and have a flow meter; and a flow rate measuring unit configured to verify an error of the flow meter; and a controller for controlling the liquid supply unit and the flow rate measuring unit, and wherein the flow rate measuring unit includes: a cup for accommodating the liquid; a measuring means configured to verify a level of the liquid accommodated in the cup; and a discharge line for discharging the liquid within the cup and having a discharge valve is installed thereon, and wherein the controller controls the liquid supply unit to discharge a liquid of a first amount to the cup for a first time in a state at which the discharge valve is closed, and determines whether an error has occurred in the flow meter by comparing the first time and a time detected by the measuring means of the level of the liquid accommodated in the cup to reach the first amount.

In an embodiment, the measuring means includes: an auxiliary container which is provided to communicate with an inner space of the cup at a side of the cup; and a level sensor provided in the auxiliary container and for detecting the level of the liquid accommodated in the cup.

In an embodiment, the measuring means includes a level sensor provided above the cup to irradiate a light to a surface of the liquid accommodated at the cup to detect the level of the liquid.

In an embodiment, the measuring means includes a level sensor inserted into a side of the cup and for detecting the level of the liquid accommodated in the cup.

In an embodiment, the measuring means includes: a first pipe communicating with the cup at a first height; a second pipe communicating with the cup at a second height which is higher than the first height; and a third pipe communicating with the first pipe and the second pipe; and a level sensor provided within the third pipe and for detecting the level of the liquid accommodated in the third pipe.

In an embodiment, the controller further includes an alarm unit for generating an alarm if it is determined that an error has occurred in the flow meter.

In an embodiment, the flow rate measuring unit is provided within the housing.

The inventive concept provides a method for verifying an error of a flow meter provided at a liquid supply unit using a flow rate measuring unit. The flow rate measuring unit comprising includes a cup for accommodating a liquid; a measuring means configured to verify a level of the liquid accommodated in the cup; and a discharge line for discharging the liquid within the cup and having a discharge valve is installed thereon, and wherein the method for verifying the error of the flow meter includes: setting a flow rate of the flow meter; and verifying an error of the flow meter by discharging a liquid of a first amount to the cup by the liquid supply unit for a first time in a state at which the discharge valve is closed, and detecting the level of the liquid by the measuring means.

In an embodiment, the setting the flow rate of the flow meter comprises firstly setting a providing position of the measuring means by putting the liquid of the first amount which has been actually measured into the cup in the state at which the discharge valve is closed.

In an embodiment, the method for verifying the error of the flow meter further includes adjusting a flow rate of the flow meter based on a determination made on whether the level of the liquid measured by the measuring means corresponds to the first amount after firstly setting the providing position and discharging the liquid of the first amount for the first time to the cup in the state at which the discharge valve is closed by liquid supply unit.

In an embodiment, the verifying the error of the flow meter includes determining whether the level of the liquid accommodated in the cup is the first amount by the measuring means.

In an embodiment, the detecting the error of the flow meter includes comparing the first time and a time for the level of the liquid accommodated in the cup to reach the first amount by the measuring means.

In an embodiment, the detecting the error of the flow meter including generating an alarm if it is determined that an error has occurred in the flow meter.

According to an embodiment of the inventive concept, an error of a flow meter may be accurately measured.

The effects of the inventive concept are not limited to the above-mentioned ones, and the other unmentioned effects will become apparent to those skilled in the art from the following description.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
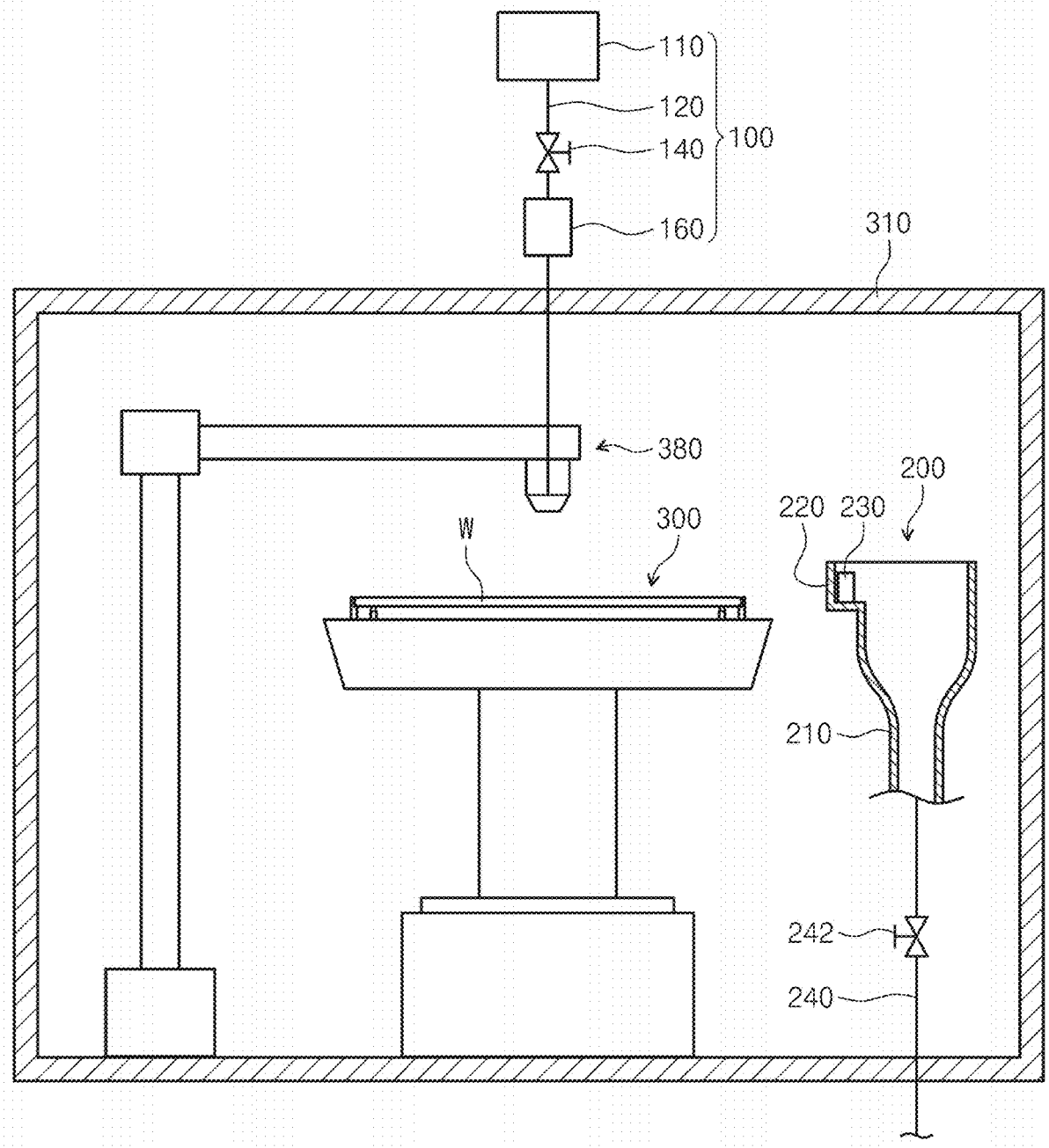
FIG. 1 schematically illustrates a substrate treating apparatus according to an embodiment of the inventive concept.

The inventive concept may be variously modified and may have various forms, and specific embodiments thereof will be illustrated in the drawings and described in detail. However, the embodiments according to the concept of the inventive concept are not intended to limit the specific disclosed forms, and it should be understood that the present inventive concept includes all transforms, equivalents, and replacements included in the spirit and technical scope of the inventive concept. In a description of the inventive concept, a detailed description of related known technologies may be omitted when it may make the essence of the inventive concept unclear.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Hereinafter, embodiments of the inventive concept will be described in detail with reference to the accompanying drawings.

Hereinafter, an embodiment of a substrate treating apparatus for liquid-treating a substrate W using a liquid will be described. FIG. 1 is a cross-sectional view illustrating an embodiment of the substrate treating apparatus. Referring to FIG. 1, the substrate treating apparatus has a housing 310, a support unit 300, a nozzle 380, a liquid supply unit 100, and a flow rate measuring unit 200.

The housing 310 provides a space in which a substrate treatment process is performed. The support unit 300 is disposed in the housing 310. The support unit 300 supports the substrate during the process. In an embodiment, the support unit 300 supports the substrate during the process and rotates the substrate. In an embodiment, the support unit 300 has a top surface which is generally provided in a circular shape when viewed from above.

The nozzle 380 supplies a liquid to the substrate W during the substrate treatment process. One or a plurality of nozzles 380 may be provided. The liquid supply unit 100 supplies the liquid to the nozzle 380. For example, the liquid may be an acidic solution such as a hydrofluoric acid, a sulfuric acid, a nitric acid, a phosphoric acid, etc., or a chemical solution such as an alkaline solution containing a potassium hydroxide, a sodium hydroxide, an ammonium, etc. Selectively, the liquid may be an organic solvent such as an isopropyl alcohol or a pure water. Also, the liquid may be a photosensitive liquid such as a photoresist liquid. The type of liquid is not limited thereto. In an embodiment, the nozzle 380 is provided to be movable. In an embodiment, the nozzle 380 is provided to be movable between a position corresponding to the substrate W placed on the support unit 300 and a position corresponding to a cup 210 to be described later when viewed from above.

The liquid supply unit 100 includes a liquid supply source 110, a supply line 120, a supply valve 140, and a flow meter 160.

The liquid supply source 110 stores the liquid. The supply line 120 supplies the liquid stored in the liquid supply source 110 to the nozzle 380. The supply valve 140 controls whether the liquid supplied to the nozzle 380 through the supply line 120 is supplied. The flow meter 160 adjusts a flow rate of the liquid supplied to the nozzle 380. In an embodiment, the flow meter 160 supplies a flow rate input by a user to the nozzle 380 for a predetermined time.

The flow rate measuring unit 200 verifies an error of the flow meter 160. The flow rate measuring unit 200 includes a cup 210, a measuring means 230, a discharge line, and a discharge valve 242. The liquid is accommodated in the cup 210. In an embodiment, the cup 210 receives the liquid supplied from the nozzle. The measuring means 230 detects a level of the liquid contained in the cup 210. The discharge line 240 is provided with a discharge valve 242. The discharge valve 242 controls whether the liquid contained in the cup 210 is discharged.

Figure 2:
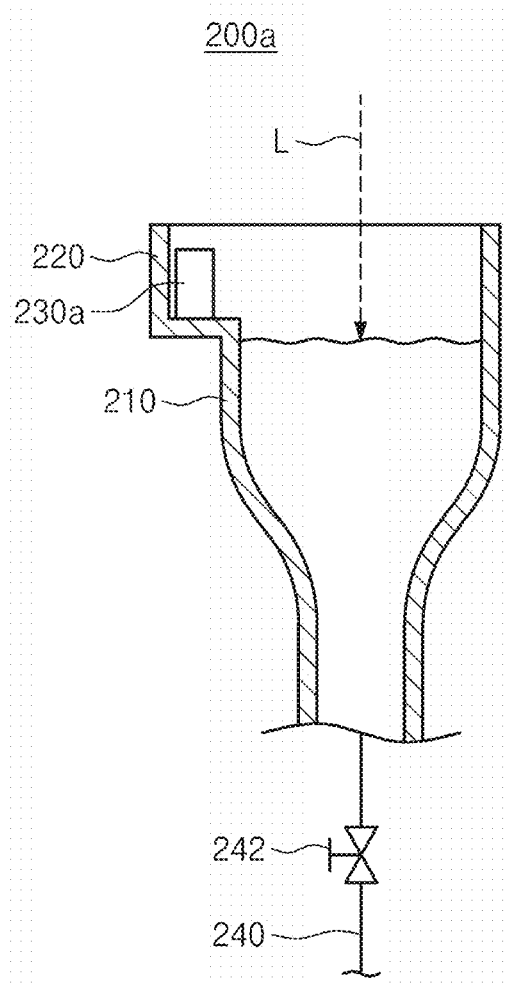
FIG. 2 illustrates a flow rate measuring unit according to an embodiment of the inventive concept.

FIG. 2 illustrates a state of the flow rate measuring unit 200 according to an embodiment of the inventive concept. Referring to FIG. 2, the measuring means 230 includes an auxiliary container 220 and a level sensor 230a. The auxiliary containers 220 are provided to communicate with an inner space of the cup 210 at a side of the cup 210. Accordingly, if the liquid accommodated in the cup 210 reaches a predetermined level, the liquid is also accommodated in the auxiliary container 220. The level sensor 230a is provided in the auxiliary container 220. In an embodiment, the level sensor 230a may be in contact with the liquid to detect the level of the liquid. In an embodiment, the level sensor 230a may transmit a measurement data in real time to a means such as a controller. For example, the level sensor 230a may transmit a data such as a measured level of the liquid and a time from the time the liquid is discharged until it reaches a predetermined level to a means such as the controller.

Figure 3:
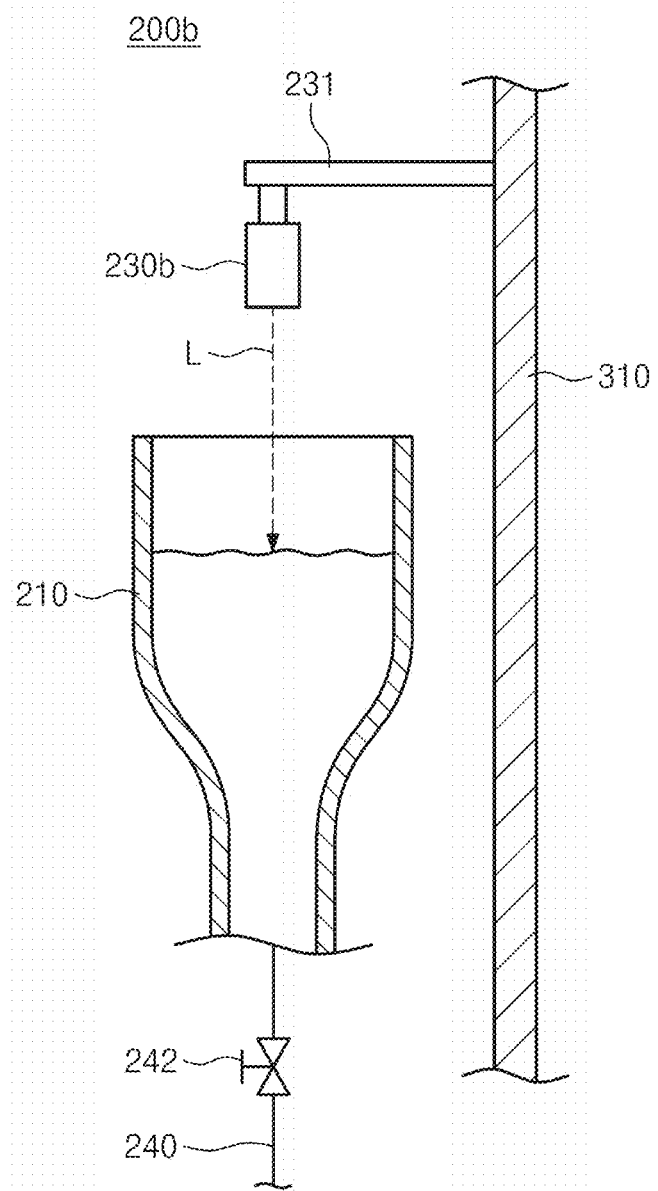
FIG. 3 to FIG. 5 each illustrate a measuring means according to another embodiment of the inventive concept.
Figure 4:
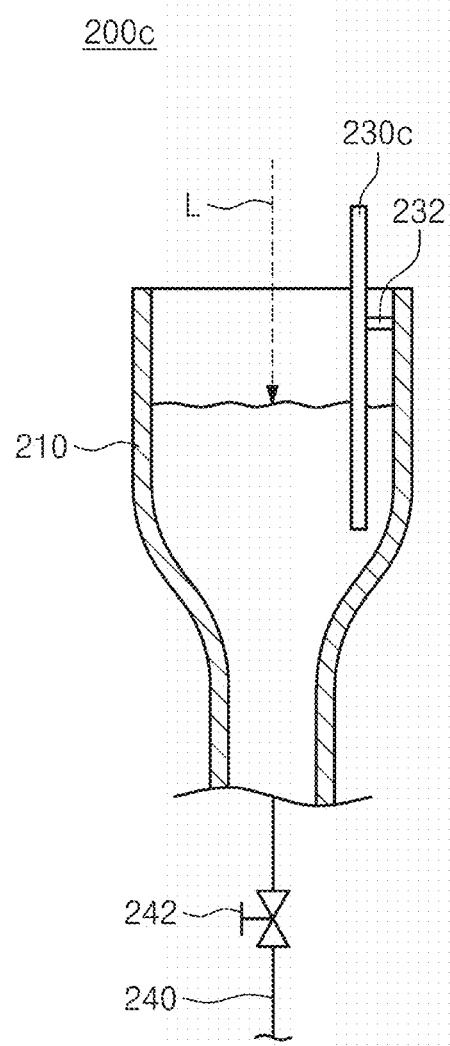
Figure 5:
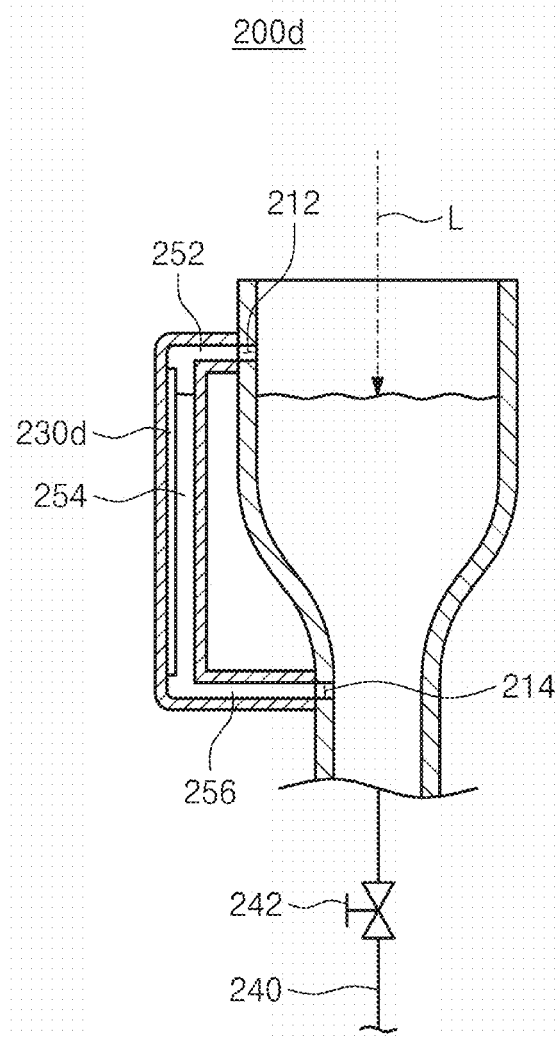

FIG. 3 to FIG. 5 respectively illustrate a state of the measuring means 230 according to another embodiment of the inventive concept.

Referring to FIG. 3, the measuring means 230 includes a level sensor 230b provided above the cup 210. The level sensor 230b detects the level of the liquid by irradiating a light to a surface of the liquid accommodated in the cup 210. That is, the level sensor 230b may measure the level of the liquid in a non-contact manner without contacting the liquid. In an embodiment, the level sensor 230b may be mounted on a support member 231 fixed to the housing 310.

Referring to FIG. 4, the measuring means 230 includes a level sensor 230c mounted on the cup 210. In an example, the measuring means 230 may include a level sensor 230c which is inserted into a side of the cup 210 and detects the level of the liquid contained in the cup (210). In one example, the level sensor 230c is mounted on a support member 232 fixed to the cup 210. The level sensor 230c may be in contact with the liquid to detect the level of the liquid.

Referring to FIG. 5, the measuring means 230 includes a first pipe 252, a second pipe 256, a third pipe 254, and a level sensor 230d. The first pipe 252 communicates with the cup 210 at a first height. The second pipe 256 communicates with the cup 210 at a second height which is higher than the first height. The third pipe 254 communicates with the first pipe 252 and the second pipe 256. The third pipe 254 is provided vertically to the first pipe 252 and the second pipe 256. If the liquid accommodated in the cup 210 exceeds a predetermined level, the liquid escapes to the first pipe 252 through a first hole 212. Since the second pipe 256 returns the liquid to the cup 210 through a second hole 214, the level of the liquid is maintained constant. The level sensor 230d is provided in the third pipe 254 to detect the level of the liquid accommodated in the third pipe 254. The level sensor 230d may be in contact with the liquid to detect the level of the liquid.

In an embodiment, if the controller determines that there is an error in the flow meter 160, an alarm unit (not shown) for generating an alarm may be further included.

Hereinafter, an error verification method of the flow meter 160 of the inventive concept will be described with reference to FIG. 6 to FIG. 11. The controller may control the substrate treating apparatus to perform the error verification method of the flow meter 160 of the inventive concept. Hereinafter, it will be described that the measuring means 230 is provided to the auxiliary container 220 and the level sensor 230a. However, in contrast, another embodiment of the above-described measuring means 230 may be used.

Figure 6:
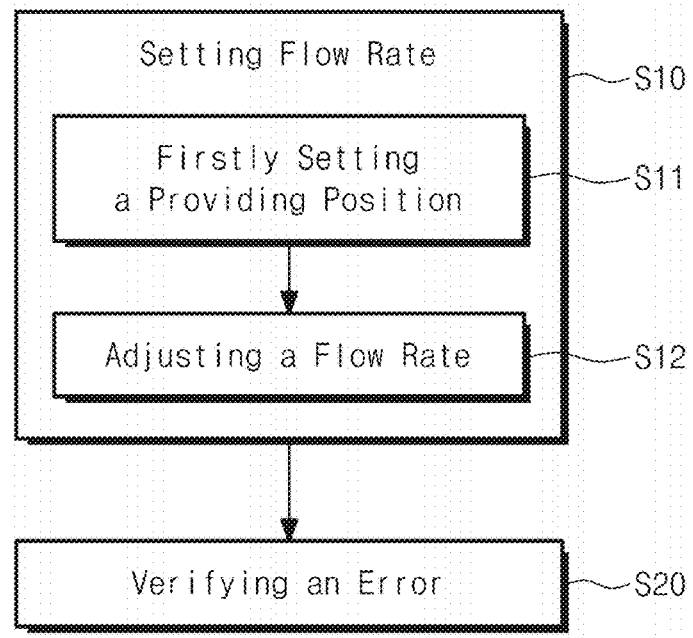
FIG. 6 illustrate a flowchart of a flow meter error verification method according to an embodiment of the inventive concept.

FIG. 6 illustrates a flowchart of the error verification method of the flow meter 160 according to the inventive concept. Referring to FIG. 6, the error verification method of the flow meter 160 of the inventive concept includes a flow rate setting step S10 and an error verification step S20. In the flow rate setting step S10, a flow rate of the flow meter 160 is set. The flow rate setting step S10 includes a first setting step S11 and a second setting step S12.

Figure 7:
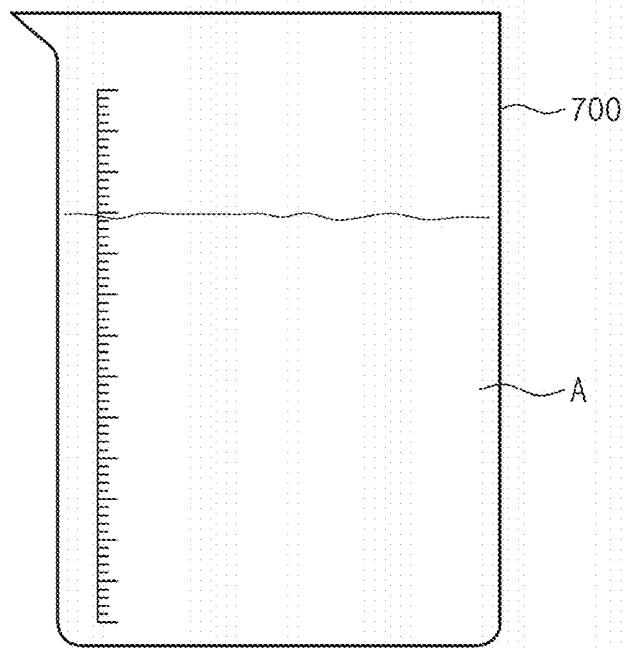
FIG. 7 to FIG. 11 sequentially illustrate the flow meter error verification method of the inventive concept.
Figure 8:
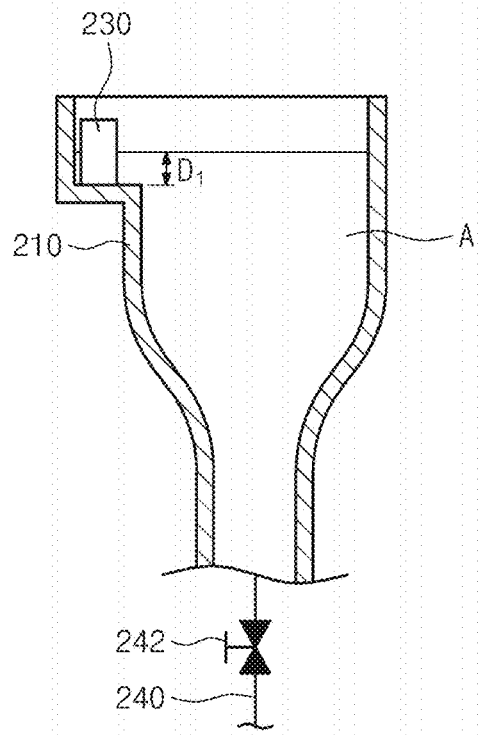
Figure 9:
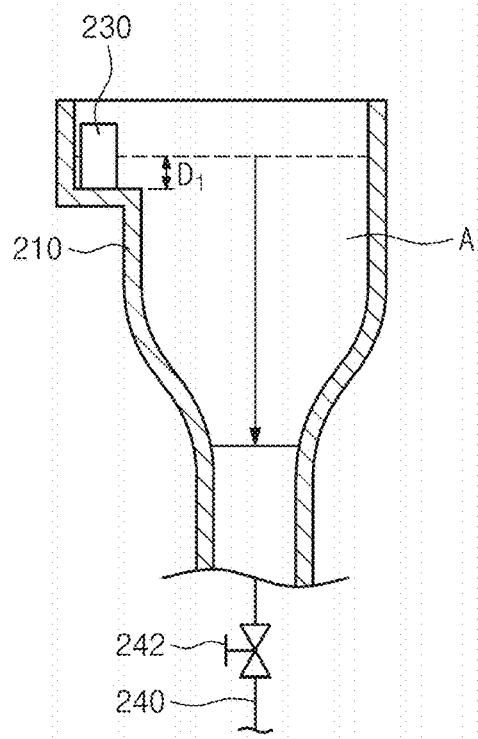

In the first setting step S11, a providing position of the measuring means 230 is set. For example, in the first setting step S11, a providing position of the level sensor 230a is determined. FIG. 7 to FIG. 8 illustrate the first setting step S11. It is assumed that an amount of the liquid to be supplied to the substrate is a first amount A. First, the liquid is placed in the measuring means such as a beaker 700 to measure whether the liquid is a first amount A. Thereafter, as illustrated in FIG. 8, the liquid of the first amount A measured while the discharge valve 242 is locked is placed in the cup 210 to set the providing position of the measuring means 230. For example, if the liquid of the first amount A is placed in the cup 210, a mounting position of the level sensor 230a is set so that the liquid can contact the level sensor 230a while the auxiliary container is filled with the liquid. If the mounting of the level sensor 230a is completed, as illustrated in FIG. 9, the discharge valve 242 is opened to empty the cup 210.

Figure 10:
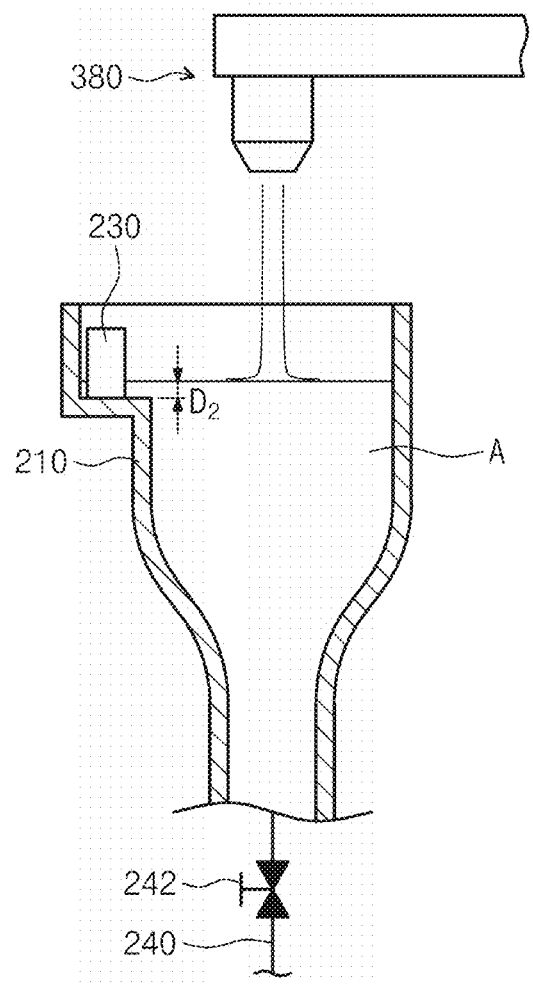

After the first setting step S11, the second setting step S12 is performed. In the second setting step S12, as illustrated in FIG. 10, the liquid supply unit 100 discharges the first amount A of the liquid to the cup 210 for the first time while the discharge valve 242 is locked. In the first setting step S11, it is determined whether the level of the liquid measured by the level sensor 230a in a set position corresponds to the first amount A, and the flow rate of the flow meter 160 is adjusted based on this. If the flow rate measured by the level sensor 230a is different from that of the first setting step S11, as illustrated in FIG. 10, the flow rate of the flow meter 160 is adjusted.

After the second setting step S12, the error verification step S20 is performed. In the error verification step S20, it is determined whether there is an error in the flow meter 160. In the flow rate setting step S10, it is confirmed whether the flow rate of the liquid supplied through the flow meter 160 for the first time corresponds to the first amount A, but an error may occur in the flow meter 160 due to a repeated use or the like.

Figure 11:
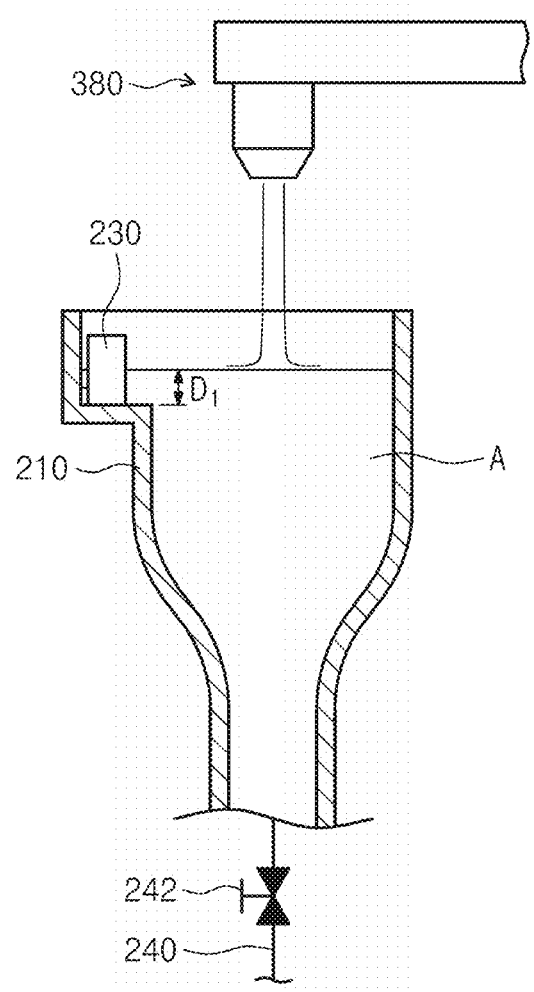

Accordingly, as shown in FIG. 11, the liquid supply unit 100 discharges the first amount A of the liquid to the cup 210 for the first time while the discharge valve 242 is locked, but the measuring means 230 determines whether the level of the liquid accommodated in the cup 210 is the first amount A or not.

Alternatively, the liquid supply unit 100 discharges the first amount A of the liquid to the cup 210 for the first time while the discharge valve 242 is locked, but compares the first time with the time at which the measuring means 230 detects that the level of the liquid contained in the cup 210 has reached the first amount A to detect whether an error has occurred in the flow meter 160.

In an embodiment, if the controller determines that there is an error in the flow meter 160, the alarm unit generates an alarm.

According to the inventive concept, in order to verify the error of the flow meter 160, a time until a preset amount of the liquid reaches the preset level in the cup 210, a height of the liquid, etc is transmitted to the controller in real time to verify the error of the flow meter 160 and to store a log data. Accordingly, there is an advantage in that it is possible to know whether an error in the flow meter 160 has occurred and to determine at what point the error in the flow meter 160 has occurred.

In addition, according to the inventive concept, the flow rate measurement unit 200 is provided in the housing 310 to verify the error in the flow meter 160, so that the operator does not need to open the housing 310 to measure the flow rate, thereby ensuring a safety of the worker and reducing a risk of foreign substances entering the housing 310.

The effects of the inventive concept are not limited to the above-mentioned effects, and the unmentioned effects can be clearly understood by those skilled in the art to which the inventive concept pertains from the specification and the accompanying drawings.

Although the preferred embodiment of the inventive concept has been illustrated and described until now, the inventive concept is not limited to the above-described specific embodiment, and it is noted that an ordinary person in the art, to which the inventive concept pertains, may be variously carry out the inventive concept without departing from the essence of the inventive concept claimed in the claims and the modifications should not be construed separately from the technical spirit or prospect of the inventive concept.

What is claimed is:

1. A substrate treating apparatus comprising:
 a housing having a treating space for treating a substrate therein;
 a support unit configured to support the substrate at the treating space;
 a nozzle for supplying a liquid to the substrate placed on the support unit;
 a liquid supply unit configured to supply the liquid to the nozzle and have a flow meter;
 a flow rate measuring unit configured to verify an error of the flow meter; and
 a controller for controlling the liquid supply unit and the flow rate measuring unit,
 wherein the flow rate measuring unit is provided in the treating space,
 wherein the flow rate measuring unit comprises:
  a cup for accommodating the liquid;
  a measuring means configured to verify a level of the liquid accommodated in the cup; and
  a discharge line for discharging the liquid within the cup and having a discharge valve installed thereon,
 wherein the measuring means comprises
  an auxillary container which is provided to communicate with an inner space of the cup at a side of the cup; and
  a level sensor provided the auxiliary container and for detecting the level of the liquid accommodated in the cup,
 wherein a bottom portion of the auxiliary container is located at a height corresponding to an upper portion of an inner space of the cup,
 wherein the controller controls the liquid supply unit to discharge a liquid of a first amount to the cup for a first time in a state at which the discharge valve is closed, and
 controls the measuring means to determine whether an error has occurred in the flow meter by determining whether the level of the liquid accommodated in the cup is the first amount.

2. The substrate treating apparatus of claim 1, wherein the controller further comprises an alarm unit for generating an alarm if it is determined that an error has occurred in the flow meter.

* * * * *